US006984692B2

(12) United States Patent
Kumaki et al.

(10) Patent No.: US 6,984,692 B2
(45) Date of Patent: Jan. 10, 2006

(54) POLYVINYL ACETAL AND ITS USE

(75) Inventors: Yousuke Kumaki, Kurashiki (JP);
Takeshi Kusudou, Kurashiki (JP);
Naoki Fujiwara, Kurashiki (JP); Bernd Papenfuhs, Frankfurt am Main (DE);
Simon Jonas, Frankfurt am Main (DE)

(73) Assignees: Kuraray Co., Ltd., Kurashiki (JP);
Kuraray Specialities Europe GmbH, Frankfurt am Main (DE)

( * ) Notice: Subject to any disclaimer, the term of this patent is extended or adjusted under 35 U.S.C. 154(b) by 0 days.

(21) Appl. No.: 10/760,453

(22) Filed: Jan. 21, 2004

(65) Prior Publication Data
US 2004/0152835 A1 Aug. 5, 2004

(30) Foreign Application Priority Data
Jan. 23, 2003 (JP) .............................. 2003-014690

(51) Int. Cl.
*C08F 116/06* (2006.01)
(52) U.S. Cl. .......................................... 525/60; 525/61
(58) Field of Classification Search ............... 525/60, 525/61
See application file for complete search history.

(56) References Cited

U.S. PATENT DOCUMENTS

| 5,194,492 A | 3/1993 | Pinschmidt, Jr. et al. |
| 5,270,379 A | 12/1993 | McAndrew et al. |

FOREIGN PATENT DOCUMENTS

| EP | 0 339 371 | 11/1989 |
| EP | 0 461 399 | 12/1991 |
| EP | 0 535 643 | 4/1993 |
| EP | 799712 A1 * | 10/1997 |
| EP | 1 099 672 | 5/2001 |
| EP | 1 178 056 | 2/2002 |
| EP | 1 180 529 | 2/2002 |
| EP | 1 251 147 | 10/2002 |
| EP | 1 384 730 | 1/2004 |
| EP | 1 384 731 | 1/2004 |
| JP | 63-79752 | 4/1988 |
| JP | 11-349889 | 12/1999 |
| JP | 2000-503341 | 3/2000 |
| WO | WO 02/059167 | 8/2002 |
| WO | WO 03/0281430 | 4/2003 |

OTHER PUBLICATIONS

Patent Abstracts of Japan, JP 63-079741, Apr. 9, 1988.

\* cited by examiner

*Primary Examiner*—Bernard Lipman
(74) *Attorney, Agent, or Firm*—Oblon, Spivak, McClelland, Maier & Neustadt, P.C.

(57) ABSTRACT

The invention provides a novel polyvinyl acetal having N-vinylamide monomer units in the molecule, and provides a binder with the novel polymer for ink or paint and for ceramic forming. Compared with conventional polyvinyl acetals, the novel polymer lowers the solution viscosity and increases the solid content (pigment content) of ink or paint in which the polymer serves as a binder. The binder with the novel polymer for ceramic molding enables production of thin and homogeneous ceramic green sheets of high strength.

16 Claims, No Drawings

POLYVINYL ACETAL AND ITS USE

BACKGROUND OF THE INVENTION

1. Field of the Invention

The present invention relates to a polyvinyl acetal. More precisely, it relates to a polyvinyl acetal having N-vinylamide monomer units in the molecule, and to its use.

2. Description of the Related Art

It has been known since long ago that polyvinyl acetal is obtained by acetalyzing polyvinyl alcohol with an aldehyde compound under an acidic condition. Polyvinyl alcohol generally has vinyl alcohol units and vinyl ester units. Therefore, polyvinyl acetal obtained through acetalization of such polyvinyl alcohol comprises at least three types of monomer units that include vinyl acetal units in addition to the two types of monomer units of the starting polyvinyl alcohol. Recently, many different types of polyvinyl alcohol have been proposed, and many different types of polyvinyl acetal have been known by combining such different types of polyvinyl alcohol with various types of aldehyde.

Above all, polyvinyl formal to be produced from polyvinyl alcohol and formaldehyde, polyvinyl acetal to be produced from polyvinyl alcohol and acetaldehyde, and polyvinyl butyral to be produced from polyvinyl alcohol and butylaldehyde stand the essential situation in trade.

In particular, polyvinyl butyral is used not only for interlayer films for windowpanes for automobiles and buildings but also in other various industrial fields of binder for ceramic forming, photosensitive materials, dispersant for ink, etc. For example, in the paint field of its industrial applications, the polymer is used for paint for automobiles, baking enamel, shop primer, wash primer, adhesive lacquer, insulating coat on tar or nicotine, paint for plastics, nitrocellulose lacquer, paper varnish, etc. For binder for printing ink for wrapping or packaging materials, used is polyvinyl butyral of low solution viscosity. The printing ink that comprises the polymer well adheres to organic and inorganic substrates and is therefore suitable for prints on polyolefin films, metal foil, cellulose acetate films, polyamide films and polystyrene films.

These days, in particular, printers are driven at high speed in many cases. Therefore, for realizing such high-speed driving of printers, it is said that the printing ink must have a high pigment content at its desired viscosity, and, even if the printed ink film is thin, the print color intensity must be high. In general, for increasing the pigment content of printing ink, it is important to lower the solution viscosity thereof. For lowering the solution viscosity of printing ink, use of polyvinyl acetal having a low degree of polymerization may be taken into consideration. However, using polyvinyl acetal of low polymerization, which is produced through acetalization of completely hydrolyzed polyvinyl alcohol, is problematic in that the aqueous solution of the polyvinyl acetal readily gels and the pigment content of ink with the polymer could not increase.

To solve these problems, for example, proposed are a method of using polyvinyl butyral produced from polyvinyl alcohol having a specific degree of hydrolysis (for example, see JP-A 11-349889), and a method of using polyvinyl acetal produced from polyvinyl alcohol having 1-alkylvinyl alcohol units and 1-alkylvinyl acetate units (for example, see JP-T 2000-503341—The term "JP-T" as used herein means a published Japanese translation of a PCT patent application). These methods may be effective in some degree for solving the problems as above, but could not always lead to satisfactory results.

On the other hand, in the field of binder for ceramic forming, polyvinyl acetal is used, for example, as a forming binder in the process of producing ceramic laminate capacitors or producing ceramic substrates for electronic circuits. In particular, polyvinyl acetal is much used as a binder in producing ceramic green sheets.

These days, in particular, precision electric appliances such as mobile phones and notebook-size personal computers are desired to be small-sized and lightweight, and small-sized, electric and electronic parts with a good performance for these are desired. For example, small-sized, large-capacity ceramic laminate capacitors are desired, for which various methods have been tried for more reducing the thickness of the electrode part or the ceramic part and for further increasing the capacity. From the technical viewpoint, it is a matter of importance to thin the ceramic green sheets for them. For reducing the thickness of the sheets, ceramic powder having a small particle size must be used as the starting material. However, ceramic powder having such a reduced particle size shall have an increased surface area and will therefore readily aggregate. Accordingly, the ceramic powder of the type causes some problems in that the surface of the ceramic green sheets formed of it is often roughened, homogeneous ceramic green sheets are difficult to obtain, and the mechanical strength of thin sheets is low. At present, these problems could not be satisfactorily solved by the polyvinyl acetal heretofore known in the art.

SUMMARY OF THE INVENTION

An object of the invention is to provide a novel polyvinyl acetal of which the solution viscosity is low, the solid content is high (the pigment content is high) and the ink dispersibility is good, and which is suitable for producing ink or paint.

Another object of the invention is to provide a polyvinyl acetal suitable for a binder for ceramic forming, which enables production of homogeneous ceramic green sheets of high strength even when ceramic powder having a reduced grain size is used as the starting material for reducing the thickness of the ceramic green sheets formed of it.

We, the present inventors have assiduously studied to attain the subject matter as above and, as a result, have found that it can be attained by a polyvinyl acetal that starts from a specific polyvinyl alcohol. On the basis of this finding, we have completed the present invention.

Specifically, the invention is a polyvinyl acetal that contains N-vinylamide monomer units in the molecule.

DESCRIPTION OF THE PREFERRED EMBODIMENTS

The invention is described in detail herein under.

The polyvinyl acetal of the invention must indispensably contain N-vinylamide monomer units, and the monomer unit content thereof is preferably from 0.1 to 20 mol %, more preferably from 0.5 to 15mol %, evenmore preferably from 1 to 12mol %. Polyvinyl acetal having an N-vinylamide monomer unit content of smaller than 0. 1mol % could not attain the subject matter of the invention to the effect that its viscosity is low when its solid content (pigment content) is high; and polyvinyl acetal having an N-vinylamide monomer unit content of larger than 20 mol % will be difficult to produce.

N-vinylamide monomers for the polymer include, for example, monomers of the following formula (1), N-vinyl-2-pyrrolidones and N-vinyl-2-caprolactam.

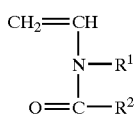

(1)

wherein $R^1$ represents a hydrogen atom, or an alkyl group having from 1 to 3 carbon atoms; and $R^2$ represents a hydrogen atom, or an alkyl group having from 1 to 5 carbon atoms.

In formula (1), the alkyl group having from 1 to 3 carbon atoms for $R^1$ includes, for example, a methyl group, an ethyl group, a propyl group, and an isopropyl group. The alkyl group having from 1 to 5 carbon atoms for $R^2$ includes, for example, a methyl group, an ethyl group, a propyl group, an isopropyl group, a butyl group, an isobutyl group, a t-butyl group, a pentyl group, and an isopentyl group.

Concretely, examples of the monomer of formula (1) are N-vinylformamide, N-methyl-N-vinylformamide, N-vinylacetamide, and N-methyl-N-vinylacetamide.

Examples of N-vinyl-2-pyrrolidones are N-vinyl-2-pyrrolidone, N-vinyl-3-propyl-2-pyrrolidone, N-vinyl-5,5-dimethyl-2-pyrrolidone, and N-vinyl-3,5-dimethyl-2-pyrrolidone.

For the N-vinylamide monomers for use herein, preferred are the monomers of formula (1) and N-vinyl-2-caprolactam from the viewpoint of the effect of the polymer for reducing viscosity at high solid content (high pigment content) and for giving homogeneous ceramic green sheets.

For producing the polyvinyl acetal of the invention, employable is a known method of acetalization of a polyvinyl alcohol (hereinafter abbreviated as "PVA") that contains N-vinylamide monomer units with an aldehyde compound in an aqueous solvent under an acidic condition. When the vinyl acetal monomer units in the polymer are counted in terms of the number of two acetalized vinyl alcohol monomer units, then the degree of acetalization of the polymer is preferably from 45 to 80 mol %, more preferably from 50 to 78 mol %, even more preferably from 60 to 75 mol %. Polyvinyl acetal of which the degree of acetalization is lower than 45 mol % is unfavorable since the powdery reaction product obtained through acetalization will be difficult to recover; and polyvinyl acetal of which the degree of acetalization is higher than 80 mol % will be difficult to produce.

For acetalization of N-vinylamide-having PVA under an acidic condition, for example, employable is (a) a method that comprises dissolving N-vinylamide-having PVA in water under heat to prepare an aqueous PVA solution having a concentration of from 5 to 30%, cooling it to a temperature falling between 5 and 50° C., adding thereto a predetermined amount of aldehyde, then further cooling it to a temperature falling between −10 and 30° C., and controlling the pH of the aqueous solution to be at most 1 by adding acid thereto to thereby initiate acetalization of PVA; or (b) a method that comprises dissolving N-vinylamide-having PVA in water under heat to prepare an aqueous PVA solution having a concentration of from 5 to 30%, cooling it to a temperature falling between 5 and 50° C., controlling the pH of the aqueous solution to be at most 1 by adding acid thereto, then further cooling it to a temperature falling between −10 and 30° C., and adding thereto a predetermined amount of aldehyde to thereby initiate acetalization of PVA. The time for acetalization generally falls between 1 and 10 hours or so, and the reaction is preferably effected with stirring. In case where the degree of acetalization of the polyvinyl acetal prepared according to the above-mentioned acetalization method could not increase, the reaction may be further continued at an elevated temperature falling between 50 and 80° C. or so. The powdery reaction product obtained through the reaction is taken out through filtration, neutralized with an aqueous alkali solution, then washed with water and dried to obtain the intended polyvinyl acetal of the invention.

The aldehyde compound includes, for example, formaldehyde, acetaldehyde, propionaldehyde, butylaldehyde, hexylaldehyde and benzaldehyde. Their mixtures may also be used in the invention. Of those, preferred are alkylaldehydes having at most 4 carbon atoms and benzaldehyde, and more preferred is butylaldehyde.

If desired, a carboxylic acid-containing aldehyde compound may be used along with the aldehyde compound as above.

The acid to be used in acetalization is generally an inorganic acid such as hydrochloric acid, sulfuric acid or nitric acid, or an organic acid such as p-toluenesulfonic acid, and their mixtures may also be used. The alkali compound to be used as a neutralizing agent after the reaction includes, for example, alkali metal hydroxides such as sodium hydroxide and potassium hydroxide, as well as amine compounds such as ammonia, triethylamine and pyridine.

For producing N-vinylamide-having PVA, employable is any known method of, for example, hydrolyzing a polyvinyl ester that is obtained through copolymerization of a vinyl ester monomer such as vinyl acetate with an N-vinylamide monomer, in a solution of alcohol or dimethylsulfoxide.

The vinyl ester monomer includes, for example, vinyl formate, vinyl acetate, vinyl propionate, vinyl valerate, vinyl caprate, vinyl laurate, vinyl stearate, vinyl benzoate, vinyl pivalate and vinyl versatate. Of those, preferred is vinyl acetate for industrial PVA production.

Not detracting from the advantages of the invention, PVA to give the polyvinyl acetal of the invention may contain any other monomer units than vinyl alcohol monomer units, vinyl ester monomer units and N-vinylamide monomer units. The additional monomer units include, for example, those of α-olefins such as ethylene, propylene, 1-hexene; acrylamide and acrylamide derivatives such as N-methylacrylamide; methacrylamide and methacrylamide derivatives such as N-methylmethacrylamide; vinyl ethers such as methyl vinyl ether, ethyl vinyl ether, n-propyl vinyl ether, i-propyl vinyl ether, n-butyl vinyl ether; hydroxyl group-having vinyl ethers such as ethylene glycol vinyl ether, 1,3-propanediol vinyl ether, 1,4-butanediol vinyl ether; allyl acetate; allyl ethers such as propyl allyl ether; oxyalkylene group-having monomers; vinylsilanes such as vinyltrimethoxysilane; isopropenyl acetate; hydroxyl group-having α-olefins such as 3-buten-1-ol, 4-penten-1-ol, 5-hexen-1-ol, 7-octen-1-ol, 3-methyl-3-buten-1-ol; carboxyl acid group-having monomers such as acrylic acid, methacrylic acid, crotonic acid, phthalic acid, maleic acid, itaconic acid, phthalic anhydride, maleic anhydride, itaconic anhydride; monomers with a sulfonic acid group derived from ethylene sulfonic acid, allyl sulfonic acid, methallyl sulfonic acid, 2-acrylamido-2-methylpropanesulfonic acid or the like; and monomers with a cationic group derived from vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine, allylethylamine or the like. The content of the additional monomer units that are derived from such ethylenic unsaturated monomers in PVA is generally at most 5 mol %, preferably at most 2 mol %, though varying depending on the object and the use of the polymer.

PVA to give the polyvinyl acetal of the invention may be a terminal-modified derivative that is obtained by copolymerizing a vinyl ester monomer such as vinyl acetate with an N-vinylamide monomer in the presence of a thiol compound such as thioacetic acid or mercaptopropionic acid, followed by hydrolyzing the resulting polymer.

Copolymerization of vinyl ester monomer with N-vinylamide monomer may be effected in any known manner of, for example, bulk polymerization, solution polymerization, suspension polymerization or emulsion polymerization. Of those, generally employed is bulk polymerization of polymerizing the monomers in the absence of a solvent or solution polymerization of polymerizing them in a solvent such as alcohol. The alcohol that serves as a solvent in solution polymerization is, for example, a lower alcohol such as methanol, ethanol or propanol.

The initiator for copolymerization of vinyl ester monomer with N-vinylamide monomer may be any known initiator, including, for example, azo initiators such as 2,2'-azobis(isobutyronitrile), 2,2'-azobis(2,4-dimethylvaleronitrile), and peroxide initiators such as benzoyl peroxide, n-propyl peroxycarbonate. Though not specifically defined, the polymerization temperature is suitably between 0° C. and 150° C.

The copolymer of vinyl ester monomer and N-vinylamide monomer is then hydrolyzed, while it is dissolved in alcohol or optionally in water-containing alcohol. Alcohol to be used for hydrolysis may be a lower alcohol such as methanol or ethanol, and methanol is especially preferred. The alcohol for hydrolysis may contain at most 40% by weight of any other solvent such as acetone, methyl acetate or benzene.

The catalyst for hydrolysis may be an alkaline catalyst such as potassium hydroxide or sodium hydroxide, or an acid catalyst such as sulfuric acid, hydrochloric acid or p-toluenesulfonic acid.

The condition for hydrolysis may be suitably controlled depending on the structure of the polyvinyl ester and on the degree of hydrolysis of the intended PVA. In general, the molar ratio of catalyst/vinyl ester monomer units falls between 0.001 and 5.0; the reaction temperature falls between 20 and 180° C.; and the reaction time falls between 0.1 and 20 hours. Hydrolysis may be effected in any known batch process or continuous process. Thus obtained, PVA is washed in any known batch process or continuous process, and then dried. For drying it, employable is any known heating processor vacuum drying process. Generally, PVA is dried at 60 to 150° C. for 1 to 20 hours.

Since the polyvinyl acetal of the invention is obtained through acetalization of N-vinylamide-having PVA, it contains vinyl ester monomer units. The vinyl ester monomer unit content of the polymer is preferably from 0.01 to 20 mol %, more preferably from 0.5 to 15 mol %, even more preferably from 1 to 10 mol %. Polyvinyl acetal having a vinyl ester monomer unit content of smaller than 0.01 mol % is unfavorable since the starting PVA is difficult to produce; and polyvinyl acetal having a vinyl ester monomer unit content of larger than 20 mol % is also unfavorable since the subject matter of the invention of producing low-viscosity printing ink having a high solid content (high pigment content) will be difficult to attain, and, in addition, ceramic green sheets produced with it could not be homogeneous.

The degree of polymerization of PVA to give the polyvinyl acetal of the invention is not specifically defined. In case where the polyvinyl acetal is used as a binder for ink or paint, the degree of polymerization of PVA to give it is preferably from 100 to 700, more preferably from 120 to 600, even more preferably from 150 to 550. PVA having a degree of polymerization of lower than 100 is difficult to produce on an industrial scale; and PVA having a degree of polymerization of higher than 700 is unfavorable since the subject matter of the invention of producing low-viscosity printing ink having a high solid content (high pigment content) is difficult to attain. In case where the polyvinyl acetal is used as a binder for ceramic forming, the degree of polymerization of PVA to give it is preferably from 100 to 1500, more preferably from 120 to 1200, even more preferably from 150 to 1000. PVA having a degree of polymerization of lower than 100 is difficult to produce on an industrial scale; and PVA having a degree of polymerization of higher than 1500 could not produce homogeneous ceramic green sheets.

The degree of polymerization of PVA to give the polyvinyl acetal of the invention means a viscosity-average degree of polymerization thereof, and it is measured according to JIS-K6726. Concretely, PVA is re-hydrolyzed to a degree of hydrolysis of at least 99.5 mol %, and purified, and its degree of polymerization is derived from the intrinsic viscosity $[\eta]$ thereof measured in water at 30° C., according to the following equation:

$$P=([\eta]\times 1000/8.29)^{(1/0.62)}$$

Regarding the binder for ink or paint that comprises the polyvinyl acetal of the invention, the polyvinyl acetal content of printing ink or paint may vary in a broad range, depending on the intended use, but is preferably from 1 to 35% by weight, more preferably from 5 to 25% by weight. For example, ink or paint of the invention may contain from 5 to 25% by weight of pigment, from 5 to 25% of polyvinyl acetal, and some solvent.

The pigment to be in the printing ink or pigment may be any and every known organic and inorganic pigment. The solvent may be alcohols such as ethyl alcohol or esters such as ethyl acetate.

In the printing ink or paint, the polyvinyl acetal may serve as a binder by itself, or may be combined with any other extender resin or auxiliary agent. The polyvinyl acetal may serve by itself as an additive to ink.

The viscosity of the solution obtained by adding one or more pigments to a solution of the polyvinyl acetal of the invention followed by kneading the resulting pigment paste is lower than the solution viscosity that is estimated from the viscosity of the polyvinyl acetal itself. Therefore compared with any known polyvinyl acetal, the polyvinyl acetal of the invention significantly lowers the solution viscosity. Accordingly, the polyvinyl acetal of the invention may reduce the necessary amount of varnish or solvent to be used in controlling the viscosity of printing ink or paint to an optimum level, and it increases the acceptable pigment content of printing ink or paint. As a result, the invention satisfies the requirement of increasing the degree of coloration with ink or paint while the viscosity is kept optimum as in the related art and satisfies the requirement of lowering the ink or paint viscosity not changing the degree of coloration with it.

Because of its good flowability and good pigment wettability, the polyvinyl acetal of the invention is extremely suitable not only to production of highly-colored printing ink and high-solid paint but also to production of other pigment compositions.

When the polyvinyl acetal or polyvinyl acetal composition of the invention is used as a binder for ceramic powder and when the ceramic powder with it is shaped, for example, employable is any of sheet forming, pressing, extrusion or injection molding.

When the polyvinyl acetal of the invention is used as a binder for ceramic powder and when the ceramic powder with it is shaped, an organic solvent is generally used, and a plasticizer may also be used along with it. Examples of the organic solvent are alcohols such as methanol, ethanol, isopropanol, n-propanol, butanol; cellosolves such as methyl cellosolve, butyl cellosolve; ketones such as acetone, methyl ethyl ketone; aromatic hydrocarbons such as toluene, xylene; and halogenohydrocarbons such as dichloromethane, chloroform. These may be used either singly or as combined.

Examples of the plasticizer are carboxylic diesters of tri or tetraethylene glycol such as triethylene glycol di-2-ethylhexanoate, tetraethylene glycol di-2-ethylhexanoate, triethylene glycol di-n-heptanoate, tetraethylene glycol di-n-heptanoate; and dicarboxylic diesters such as dioctyl adipate, dibutyl adipate, dioctyl phthalate, dibutyl phthalate. These may be used either singly or as combined.

The ceramic powder to which the invention applies may be powder of metal or non-metal oxide or non-oxide for ceramic production. Regarding its composition, the powder may be any of simple substances or compounds, and may also be single powder alone or mixed powder. Regarding the constituent elements of the metal oxide or non-oxide, both cation and anion may be formed of a single element or multiple elements, and may further contain any other additives for improving the properties of the oxide or non-oxide. Concretely, for example, they include oxides, carbides, nitrides, borides and sulfides of Li, K, Mg, B, Al, Si, Cu, Ca, Sr, Ba, Zn, Cd, Ga, In, Y, lanthanoids, actinoids, Ti, Zr, Hf, Bi, V, Nb, Ta, W, Mn, Fe, Co or Ni. Some examples of oxide powder which contains multiple metal elements and which is generally referred to as double oxide are classified from their crystal structure, and they include perovskite structures of $NaNbO_3$, $SrZrO_3$, $PbZrO_3$, $SrTiO_3$, $BaZrO_3$, $PbTiO_3$, $BaTiO_3$; spinel structures of $MgAl_2O_4$, $ZnAl_2O_4$, $CoAl_2O_4$, $NiAl_2O_4$, $MgFe_2O_4$; ilmenite structures of $MgTiO_3$, $MnTiO_3$, $FeTiO_3$; and garnet structures of $GdGa_5O_{12}$, $Y_6Fe_5O_{12}$.

One preferred method of using the polyvinyl acetal or the polyvinyl acetal composition of the invention as a binder for ceramic powder and shaping the ceramic powder is a sheet forming process, which is as follows: A slurry that comprises, as the essential ingredients, an organic solvent, ceramic powder, and the polyvinyl acetal or the polyvinyl acetal composition is applied onto a carrier film with a blade coater, and dried, and the resulting ceramic green sheet is peeled from the carrier film. The slurry to be applied to the carrier film in the sheet forming process may optionally contain deflocculant, plasticizer, lubricant and the like, in addition to the organic solvent, the ceramic powder and the polyvinyl acetal therein.

In the sheet forming process, the amount of the polyvinyl acetal to be used could not be indiscriminately determined, as varying in accordance with the use and the object of the ceramic green sheets to be obtained therein. In general, however, it may be from 3 to 20 parts by weight, preferably from 5 to 15 parts by weight relative to 100 parts by weight of the ceramic powder used.

In the sheet forming process, the method of dispersing ceramic powder in the slurry is not specifically defined, and various dispersion methods may be employed for it. For example, employable are a method of using a medium-assisted disperser such as bead mill, ball mill, attritor, paint shaker or sand mill; a dry kneading method; and a method of using three rolls. In the dispersion methods, usable is a dispersant. The dispersant may be an anionic dispersant that contains any of carboxylic acid group, maleic acid group, sulfonic acid group or phosphoric acid group in the molecule. For it, especially preferred is an anionic dispersant with no metal ion.

The thickness of the ceramic green sheets could not be indiscriminately determined, as varying in accordance with the use and the object thereof. In general, it may fall within a range of from 1 to 300 µm. The drying temperature in the step of drying the coating film formed on the carrier film could not also be indiscriminately determined, as varying depending on the thickness of the ceramic green sheets to be produced. In general, it may fall between 60 and 200° C. or so.

The ceramic green sheets thus obtained by using the polyvinyl acetal or the polyvinyl acetal composition of the invention as a binder for them are favorable for various parts of electronic appliances, especially to chip-type laminate capacitors which are produced in a process that comprises forming electrodes on the ceramic green sheet, stacking up the thus-processed ceramic sheets under pressure and then baking the electrodes and the ceramic sheets all at a time, and to substrates for IC chip circuits.

The polyvinyl acetal of the invention is usable not only for binder for ink or paint and binder for ceramic forming but also for interlayer films for laminated safety glass and primer for metal.

EXAMPLES

The invention is described in more detail with reference to the following Examples, which, however, are not intended to restrict the scope of the invention. In the following Examples and Comparative Examples, "part" and "%" are all by weight unless otherwise specifically indicated.

Method of Analyzing PVA:

Unless otherwise specifically indicated, PVA is analyzed according to the method described in JIS-K6726. The content of N-vinylamide monomer units and the content of vinyl ester monomer units in PVA are obtained by analyzing a sample of the polymer dissolved in DMSO-d6, using a 500-MHz proton NMR device (JEOL GX-500).

Method of Analyzing Polyvinyl Acetal:

The degree of acetalization of polyvinyl acetal is obtained by analyzing a sample of the polymer dissolved in DMSO-d6, using a 500-MHz proton NMR device (JEOL GX-500).

Production Example (Production of PVA)

(1) PVA-1

16000 g of vinyl acetate monomer, 64000 g of methanol and 183.6 g of N-vinylacetamide were fed into a 200-liter reactor equipped with a stirrer, a reflux condenser, a nitrogen inlet duct, a comonomer serial addition line and a thermometer, and degassed through bubbling with nitrogen gas for 30 minutes. Heating the reactor was started, and when the inner temperature of the reactor reached 60° C., 60 g of 2,2'-azobis (isobutyronitrile) was added thereto to initiate the polymerization. After initiation of the polymerization, a 10% methanol solution of N-vinylacetamide was added to the system via the comonomer addition line, at a flow rate of 880 ml/hr. After initiation of the polymerization, in addition, 5 ml of the liquid was sampled out of the polymerization system at regular intervals of 30 minutes, and its solid content was measured. From the data, the conversion of vinyl acetate was derived, and the flow rate of the 10% methanol solution of N-vinylacetamide was so controlled that the molar ratio of the remaining vinyl acetate monomer to N-vinylacetamide could be constant, and in that controlled condition, the polymerization was continued. 5 hours after initiation of the polymerization, the system was cooled to stop the polymerization. In this stage, the solid concentration in the system was 14%, and the total amount of the 35% methanol solution of N-vinylacetamide added was 2800 ml. Next, the non-reacted vinyl acetate monomer was removed by the distillation column adding methanol. The process gave a methanol solution of polyvinyl acetate copolymer (concentration 50%).

Next, the methanol solution of polyvinyl acetate copolymer was made to have a concentration of 30% with methanol added thereto, and 6660 g of the resulting methanol solution was hydrolyzed at 40° C. with 278 g of a methanol solution of sodium hydroxide having a concentration of 10% being added thereto (the molar ratio of sodium hydroxide/vinyl acetate units in the copolymer was 0.03). After a gel product was deposited, this was ground. One hour after the addition of sodium hydroxide, 30000 g of methyl acetate was added to the system, and this was heated in a hot water bath at 70° C. for 1 hour to neutralize the non-reacted sodium hydroxide. The product was dewatered, and 30000 g of methanol was added thereto and heated in a hot water bath at 70° C. for 1 hour. The washing operation was repeated twice. Thus washed, the product was dried under heat at 65° C. for 12 hours to obtain the intended PVA. Obtained through proton NMR, the content of N-vinylacetamide monomer units and the content of vinyl ester monomer units in PVA were 3.1 mol % and 2.8 mol %, respectively. The viscosity-average degree of polymerization of PVA was obtained according to an ordinary method of JIS K6726, and it was 230.

(2) PVA-2 to PVA-24

Other PVAs (PVA-2 to PVA-23) were obtained in the same manner as that for PVA-1, except that the polymerization condition and the hydrolysis condition were varied so that the content of N-vinylamide monomer units and the content of vinyl ester monomer units in PVA and the degree of polymerization of PVA could be as in Table 1. PVA (PVA-24) was obtained in the same manner as that for PVA-1, except that 1-methylvinyl acetate was used instead of N-vinylamide monomer, and the polymerization condition and the hydrolysis condition were varied so that the content of 1-methylvinyl alcohol unit obtained by hydrolysis and the content of vinyl ester monomer unit in PVA and the degree of polymerization of PVA could be as in Table 1.

TABLE 1

| PVA No. | N-vinylamide Monomer Content (mol %) | Vinyl Ester Monomer Content (mol %) | Degree of Polymerization |
|---|---|---|---|
| PVA-1 | NVA 3.1 | 2.8 | 230 |
| PVA-2 | NVA 11.2 | 0.9 | 240 |
| PVA-3 | NVA 24.0 | 1.5 | 230 |
| PVA-4 | NVA 3.1 | 25.7 | 230 |

TABLE 1-continued

| PVA No. | N-vinylamide Monomer Content (mol %) | Vinyl Ester Monomer Content (mol %) | Degree of Polymerization |
|---|---|---|---|
| PVA-5 | NVA 2.8 | 2.6 | 620 |
| PVA-6 | NVA 8.9 | 0.3 | 500 |
| PVA-7 | NVC 1.0 | 1.0 | 220 |
| PVA-8 | NVC 2.6 | 4.3 | 220 |
| PVA-9 | NVC 5.0 | 2.3 | 250 |
| PVA-10 | NVC 11.8 | 1.1 | 240 |
| PVA-11 | NVC 6.3 | 10.2 | 310 |
| PVA-12 | NVC 0.8 | 2.1 | 640 |
| PVA-13 | NVC 6.8 | 4.9 | 520 |
| PVA-14 | NVC 4.6 | 23.3 | 570 |
| PVA-15 | NVC 24.6 | 2.0 | 540 |
| PVA-16 | NVP 4.5 | 2.5 | 200 |
| PVA-17 | None | 1.5 | 250 |
| PVA-18 | None | 4.7 | 250 |
| PVA-19 | None | 13.1 | 250 |
| PVA-20 | None | 2.4 | 550 |
| PVA-21 | None | 7.7 | 550 |
| PVA-22 | None | 13.6 | 550 |
| PVA-23 | None | 1.2 | 130 |
| PVA-24 | MVA 10.0 | 4.0 | 200 |

NVA: N-vinylacetamide
NVC: N-vinyl-2-caprolactam
NVP: N-vinyl-2-pyrrolidone
MVA: 1-methylvinyl alcohol Example 1

Production of Polyvinyl Acetal:

450 g of PVA-1 was put into 5550 ml of water, dissolved therein under heat up to 95° C. with stirring for 2 hours, and then slowly cooled. At 35° C., 265.5g of butyraldehyde was added, the temperature falling by a further 5° C. As soon as 0° C. was reached, 210ml of 20% strength hydrochloric acid were added dropwise over the course of 30 minutes, during which the temperature rose by about 1° C.; 31 minutes after the end of the metered addition of hydrochloric acid the product precipitated from the reaction solution in the form of a colorless precipitate.

After a further 29 minutes, 474 ml of 20% strength hydrochloric acid were metered in over the course of 30 minutes. Thereafter the suspension was warmed to 27° C. over the course of 2 hours and was held at this temperature for 2 hours with continued stirring.

Finally the polymer was filtered off with suction, washed until the filtrate gave a neutral reaction with distilled water, and dried under reduced pressure at 40° C. The analytical data of the thus-obtained polyvinyl acetal (polyvinyl acetal VAP-1) are given in Table 2.

From the resulting polyvinyl acetal(VAP-1), ethanolic solutions having a nonvolatile fraction of 15% and 25% by weight, was prepared and its efflux time was measured in a flow cup (DIN 53211, Ford cup, 4 mm, at 23° C.). The results are compiled in table 3.

In a second step printing inks was prepared as follows:
43.2 g of polyvinyl acetal were dissolved in 244.8 g of ethanol at room temperature. Subsequently 72 g of Hostaperm Blue B2G (pigment from Clariant GmbH) were added. The resulting mixture was dispersed in a Getzmann Dispermat, model CA 40-C, with the following settings selected:

0.5 h dispersing time,
approx. 600 g glass beads (diameter 2 mm),
stirring speed 5000 rpm Following dispersing, the pigment concentrate obtained was separated from the glass beads on a filter. To prepare the printing inks from the pigment concentrates, 80 g of each pigment concentrate were taken and this initial charge was diluted with a 15% strength by weight solution of the respective polyvinyl acetal until the printing ink had an efflux time of 25 s (DIN 53211, Ford cup, 4 mm, at 23° C.) Table 4 contains the composition of the printing inks. Also specified is the pigment: binder ratio, which reflects the proportion of the amount of pigment to binder present in the printing ink. The greater the extent to which the pigment: binder ratio is shifted toward the pigment side, the more effectively the binder used can be pigmented and the better are the dispersing properties of the binder.

Examples 2 to 14

Other polyvinyl acetals were produced in the same manner as in Example 1, except that the PVA and the aldehyde to be used were varied as in Table 2 and the amount of aldehyde to be used was varied so that the degree of acetalization of the polyvinyl acetals produced could be as in Table 2. Efflux times of the ethanolic solutions and composition of the printing inks with an efflux time of 25 s were measured and the data are given in Table 3 and Table 4.

Comparative Examples 1 to 6

Still other polyvinyl acetals were produced in the same manner as in Example 1, except that the PVA and the aldehyde to be used were varied as in Table 2 and the amount of aldehyde to be used was varied so that the degree of acetalization of the polyvinyl acetals produced could be as in Table 2. Efflux times of the ethanolic solutions and composition of the printing inks with an efflux time of 25 s were measured and the data are given in Table 3 and Table 4.

TABLE 2

| | No. of PVA used | Aldehyde used | Degree of Acetalization (mol %) | Polyvinyl Acetal No. |
| --- | --- | --- | --- | --- |
| Example 1 | PVA-1 | BuAl | 71.0 | VAP-1 |
| Example 2 | PVA-2 | BuAl | 60.1 | VAP-2 |
| Example 3 | PVA-7 | BuAl | 73.1 | VAP-3 |
| Example 4 | PVA-8 | BuAl | 70.2 | VAP-4 |
| Example 5 | PVA-9 | BuAl | 73.6 | VAP-5 |
| Example 6 | PVA-10 | BuAl | 65.9 | VAP-6 |
| Example 7 | PVA-11 | BuAl | 61.8 | VAP-7 |
| Example 8 | PVA-16 | BuAl | 72.0 | VAP-8 |
| Example 9 | PVA-1 | PrAl | 73.4 | VAP-9 |
| Example 10 | PVA-9 | PrAl | 70.7 | VAP-10 |
| Example 11 | PVA-1 | BuAl | 54.6 | VAP-11 |
| Example 12 | PVA-1 | BuAl | 41.6 | VAP-12 |
| Example 13 | PVA-3 | BuAl | 59.3 | VAP-13 |
| Example 14 | PVA-4 | BuAl | 68.5 | VAP-14 |
| Comp. Example 1 | PVA-17 | BuAl | 72.1 | VAP-15 |
| Comp. Example 2 | PVA-18 | BuAl | 72.4 | VAP-16 |
| Comp. Example 3 | PVA-19 | BuAl | 70.7 | VAP-17 |
| Comp. Example 4 | PVA-17 | PrAl | 70.9 | VAP-18 |
| Comp. Example 5 | PVA-23 | BuAl | 68.5 | VAP-19 |
| Comp. Example 6 | PVA-24 | BuAl | 68.9 | VAP-20 |

BuAl: butylaldehyde
PrAl: propylaldehyde

TABLE 3

| | Efflux time of a 15% strength by weight solution in ethanol | Efflux time of a 25% strength by weight solution in ethanol |
| --- | --- | --- |
| Example 1 | 16 s | 43 s |
| Example 2 | 15 s | 42 s |
| Example 3 | 16 s | 51 s |
| Example 4 | 15 s | 40 s |
| Example 5 | 16 s | 40 s |
| Example 6 | 14 s | 38 s |
| Example 7 | 14 s | 39 s |
| Example 8 | 16 s | 42 s |
| Example 9 | 17 s | 45 s |
| Example 10 | 17 s | 46 s |
| Example 11 | 18 s | 51 s |
| Example 12 | 19 s | 52 s |
| Example 13 | 18 s | 51 s |
| Example 14 | 18 s | 50 s |
| Comp. Example 1 | 18 s | 68 s |
| Comp. Example 2 | 18 s | 68 s |
| Comp. Example 3 | 17 s | 60 s |
| Comp. Example 4 | 19 s | 72 s |
| Comp. Example 5 | 17 s | 54 s |
| Comp. Example 6 | 17 s | 55 s |

TABLE 4

| | Pigment content (% by weight) | Polyvinyl acetal content (% by weight) | Pigment:binder ratio |
| --- | --- | --- | --- |
| Example 1 | 15.0 | 12.8 | 1:0.85 |
| Example 2 | 20.0 | 12.3 | 1:0.62 |
| Example 3 | 12.5 | 12.8 | 1:1.02 |
| Example 4 | 18.9 | 12.5 | 1:0.66 |
| Example 5 | 19.1 | 12.4 | 1:0.65 |
| Example 6 | 21.2 | 12.4 | 1:0.58 |
| Example 7 | 19.9 | 12.6 | 1:0.63 |
| Example 8 | 18.9 | 12.5 | 1:0.66 |
| Example 9 | 13.4 | 12.5 | 1:0.93 |
| Example 10 | 13.8 | 14.0 | 1:1.01 |
| Example 11 | 13.0 | 13.8 | 1:1.06 |
| Example 12 | 12.3 | 13.5 | 1:1.10 |
| Example 13 | 13.0 | 13.6 | 1:1.05 |
| Example 14 | 12.8 | 13.7 | 1:1.07 |
| Comp. Example 1 | 10.8 | 13.4 | 1:1.24 |
| Comp. Example 2 | 12.0 | 13.2 | 1:1.10 |
| Comp. Example 3 | 11.8 | 13.2 | 1:1.12 |
| Comp. Example 4 | 10.6 | 13.6 | 1:1.28 |
| Comp. Example 5 | 12.9 | 13.6 | 1:1.05 |
| Comp. Example 6 | 13.2 | 13.8 | 1:1.05 |

From the data in Table 3 and 4, it is obvious that the ethanolic solutions with any of polyvinyl acetals having N-vinylamide monomer units in the molecule (Examples 1 to 14) have a lower solution viscosity and pigment-containing solutions have a higher pigment content, as compared with those with any of polyvinyl acetals not having the monomer units therein (Comparative Examples 1 to 5), and with those with polyvinyl acetal containing 1-alkylvinyl alcohol unit therein (Comparative Example 6). In particular, the samples satisfying the requirements that the N-vinylamide monomer unit content is from 0.1 to 20 mol %, the vinyl ester monomer unit content is from 0.01 to 20 mol % and the degree of acetalization is from 45 to 80 mol % (Examples 1 to 11) are more effective for viscosity reduction and for pigment content increase and their effect is more remarkable, as compared with the other samples not satisfying the requirements (Examples 12 to 14).

Example 15

Production of Polyvinyl Acetal:

500 g of PVA-5 was put into 6500 ml of water, dissolved therein under heat up to 95° C. with stirring for 2 hours, and then slowly cooled. At 30° C., 286 g of butylaldehyde was added and then cooled to 0° C. 1000 ml of 20% hydrochloric acid solution was metrically added dropwise over the course of 30 minutes. Then the reaction solution was heated up to 30° C. over the course of 3 hours, and kept at the elevated temperature for further 2 hours. The granular product deposited was taken out through filtration and carefully washed with water. To neutralize it, 320 ml of 10% sodium hydroxide solution was added to the product suspension, and this was again gradually heated. This was then washed with water to remove the excess alkali, and the product was then dried under reduced pressure at 40° C. The analytical data of the thus-obtained polyvinyl acetal (VAP-21) are given in Table 5.

Formation of Ceramic Green Sheets:

100 parts of ceramic powder, bariumtitanate powder having a mean particle size of 0.2 $\mu$m, 10 parts of VAP-21, 3 parts of plasticizer dioctyl phthalate, 60 parts of solvent toluene and 60 parts of solvent isopropanol were mixed and milled in a ball mill along with 500 parts of zirconia ball (diameter 2 mm) therein for 16 hours. Then, this was defoamed under reduced pressure to prepare a ceramic slurry. The ceramic slurry was applied onto a release film of polyethylene terephthalate (PET film) according to a process of using a doctor blade, and dried at 105° C. for 5 minutes. Then, this was released from the PET film to obtain a ceramic green sheet having a thickness of 5 $\mu$m.

Strength of Ceramic Green Sheet:

The ceramic green sheet was blanked to give a sample of 40 mm×100 mm, and its toughness was measured with a Shimadzu's autograph DCS-100. The chuck-to-chuck distance was 30 mm; the pulling speed was 10 mm/min; and the temperature in the test was 20° C. One sample was measured 5 times, and the data were averaged. The average indicates the toughness of the sample tested. The ratio (times) to the toughness, 1.0, of the sample of Comparative Example 7 was obtained. The data are given in Table 5.

Examples 16 to 20

Production of Polyvinyl Acetal:

Still other polyvinyl acetals were produced in the same manner as in Example 15, except that the PVA and the aldehyde to be used were varied as in Table 5 and the acetalization condition was varied so that the degree of acetalization of the polyvinyl acetals produced could be as in Table 5. Using these, ceramic green sheets were formed in the same manner as in Example 15. Their surface condition was observed, and their strength was measured. The data are given in Table 5.

Comparative Examples 7 to 9

Still other polyvinyl acetals were produced in the same manner as in Example 15, except that the PVA and the aldehyde to be used were varied as in Table 5 and the amount of aldehyde to be used was varied so that the degree of acetalization of the polyvinyl acetals produced could be as in Table 5. Using these, ceramic green sheets were formed in the same manner as in Example 15. Their surface condition was observed, and their strength was measured. The data are given in Table 5.

TABLE 5

|  | No. of PVA used | Aldehyde used | Degree of Acetalization (mol %) | Polyvinyl Acetal No. | Surface Condition of Green Sheet | Strength of Green Sheet1) |
| --- | --- | --- | --- | --- | --- | --- |
| Example 15 | PVA-5 | BuAl | 67.8 | VAP-21 | A | 1.9 |
| Example 16 | PVA-6 | BuAl | 65.6 | VAP-22 | A | 2.2 |
| Example 17 | PVA-12 | BuAl | 65.9 | VAP-23 | B | 1.7 |
| Example 18 | PVA-13 | BuAl | 63.9 | VAP-24 | A | 2.6 |
| Example 19 | PVA-14 | BuAl | 68.0 | VAP-25 | B | 1.4 |
| Example 20 | PVA-15 | BuAl | 56.7 | VAP-26 | B | 1.6 |
| Comp. Example 7 | PVA-20 | BuAl | 69.7 | VAP-27 | C | 1.0 |
| Comp. Example 8 | PVA-21 | BuAl | 64.5 | VAP-28 | C | 0.8 |
| Comp. Example 9 | PVA-22 | BuAl | 59.1 | VAP-29 | C | 0.7 |

BuAl: butylaldehyde
1) The ratio (times) to the strength of the sample of Comparative Observation of Surface of Ceramic Green Sheet:

Using an optical microscope, the surface of the ceramic green sheet was observed, and this was evaluated according to the criteria mentioned below. The results are given in Table 5.

A: With neither voids nor aggregated grains, the surface is smooth and homogeneous.

B: Though no voids are seen, the surface is somewhat roughened owing to the aggregated grains therein.

C: With both voids and aggregated grains, the surface is roughened.

Example 7

From the data in Table 5, it is understood that the ceramic green sheets formed of ceramic powder combined with a binder of polyvinyl acetals having N-vinylamide monomer units in the molecule (Examples 15 to 20) have a more homogeneous surface condition and have a higher strength (toughness), as compared with those of ceramic powder combined with a binder of polyvinyl acetals not having N-vinylamide monomer units therein (Comparative Examples 7 to 9). In particular, the effect of the samples satisfying the requirements that the N-vinylamide monomer unit content is from 0.1 to 20 mol %, the vinyl ester monomer unit content is from 0.01 to 20 mol % and the degree of acetalization is from 45 to 80 mol % (Examples 15 to 18) is more remarkable, as compared with that of the other samples not satisfying the requirements (Examples 19 to 20).

As described in detail with reference to its preferred embodiments, when the polyvinyl acetal that has N-vinylamide monomer units in the molecule of the invention is used for a binder for ink or paint, the solution viscosity of the ink or paint produced can be reduced and the solid content (pigment content) thereof can be increased. The ink or paint has a high pigment content anytime when it has a desired viscosity for printing or painting. Even though the coating film formed through printing or painting with the ink or paint is thin, the printed or painted color intensity is high. Having the advantages, the polyvinyl acetal binder is useful for ink or paint, especially for ink for high-speed printers.

In addition, when the polyvinyl acetal that has N-vinylamide monomer units in the molecule of the invention is used for a binder for ceramic forming, the ceramic green sheets formed have a more homogeneous surface condition and have a higher strength, as compared with those formed with a conventional polyvinyl acetal that serves as a binder for ceramic forming. Accordingly, when the polyvinyl acetal binder of the invention is used, thinner ceramic green sheets can be formed. Such thinned ceramic green sheets are useful for small-sized, high-performance, electric and electronic parts that are especially needed these days. Accordingly, the binder for ceramic forming of the invention is especially useful in producing small-sized, large-capacity ceramic laminate capacitors and in producing ceramic substrates for electronic IC chip circuits.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claimed annexed thereto, to be construed as included herein.

What is claimed is:

1. An ink or paint comprising from 1 to 25% by weight, as a binder for said ink or paint, a polyvinyl acetal having N-vinylamide monomer units in the molecule, wherein the N-vinylamide monomer is represented by the following formula (1)

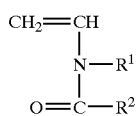

(1)

wherein $R^1$ represents a hydrogen atom, or an alkyl group having from 1 to 3 carbon atoms;
and $R^2$ represents a hydrogen atom, or an alkyl group having from 1 to 5 carbon atoms, or wherein the N-vinylamide monomer is N-vinyl-2-caprolactam.

2. A ceramic green sheet formed with a binder, wherein the binder is a polyvinyl acetal having N-vinylamide monomer units in the molecule, wherein the N-vinylamide monomer is represented by the following formula (1)

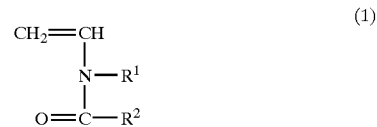

wherein $R^1$ represents a hydrogen atom, or an alkyl group having from 1 to 3 carbon atoms;
and $R^2$ represents a hydrogen atom, or an alkyl group having from 1 to 5 carbon atoms, or wherein the N-vinylamide monomer is N-vinyl-2-caprolactam.

3. The ink or paint as claimed in claim 1, wherein the polyvinyl acetal contains from 0.01 to 20 mol % of vinyl ester monomer units and from 0.1 to 20 mol % of N-vinylamide monomer units and has a degree of acetalization of from 45 to 80 mol % when the vinyl acetal monomer units therein are counted in terms of the number of two acetalized vinyl alcohol monomer units.

4. The ceramic green sheet as claimed in claim 2, wherein the polyvinyl acetal contains from 0.01 to 20 mol % of vinyl ester monomer units and from 0.1 to 20 mol % of N-vinylamide monomer units and has a degree of acetalization of from 45 to 80 mol % when the vinyl acetal monomer units therein are counted in terms of the number of two acetalized vinyl alcohol monomer units.

5. The ink or paint as claimed in claim 1, wherein the polyvinyl acetal is obtained through acetalization of a polyvinyl alcohol that has from 0.1 to 20 mol % of N-vinylamide monomer units and from 0.01 to 20 mol % of vinyl ester monomer units in the molecule.

6. The ceramic green sheet as claimed in claim 2, wherein the polyvinyl acetal is obtained through acetalization of a polyvinyl alcohol that has from 0.1 to 20 mol % of N-vinylamide monomer units and from 0.01 to 20 mol % of vinyl ester monomer units in the molecule.

7. The ink or paint as claimed in claim 3, wherein the polyvinyl acetal contains from 0.5 to 15 mol % of N-vinylamide monomer units.

8. The ceramic green sheet as claimed in claim 4, wherein the polyvinyl acetal contains from 0.5 to 15 mol % of N-vinylamide monomer units.

9. The ink or paint as claimed in claim 7, wherein the polyvinyl acetal contains from 1 to 12 mol % of N-vinylamide monomer units.

10. The ceramic green sheet as claimed in claim 8, wherein the polyvinyl acetal contains from 1 to 12 mol % of N-vinylamide monomer units.

11. The ink or paint as claimed in claim 3, wherein the degree of acetalization of from 50 to 78 mol %.

12. The ceramic green sheet as claimed in claim 4, wherein the degree of acetalization of from 50 to 78 mol %.

13. The ink or paint as claimed in claim 1, wherein the polyvinyl acetal is obtained from at least one aldehyde selected from the group consisting of alkylaldehydes having at most 4 carbon atoms and benzaldehyde.

14. The ceramic green sheet as claimed in claim 2, wherein the polyvinyl acetal is obtained from at least one aldehyde selected from the group consisting of alkylaldehydes having at most 4 carbon atoms and benzaldehyde.

15. The ink or paint as claimed in claim 13, wherein the aldehyde is butyraldehyde.

16. The ceramic green sheet as claimed in claim 14, wherein the aldehyde is butyraldehyde.

* * * * *